(12) United States Patent
Sun et al.

(10) Patent No.: US 11,324,016 B2
(45) Date of Patent: May 3, 2022

(54) MULTI-OPERATOR SHARED SPECTRUM STRUCTURE COMPATIBLE WITH FRAME-BASED EQUIPMENT

(71) Applicant: QUALCOMM Incorporated, San Diego, CA (US)

(72) Inventors: Jing Sun, San Diego, CA (US); Xiaoxia Zhang, San Diego, CA (US); Yisheng Xue, San Diego, CA (US); Tamer Kadous, San Diego, CA (US); Aleksandar Damnjanovic, Del Mar, CA (US); Arumugam Chendamarai Kannan, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/518,843

(22) Filed: Jul. 22, 2019

(65) Prior Publication Data

US 2020/0037336 A1 Jan. 30, 2020

Related U.S. Application Data

(60) Provisional application No. 62/703,322, filed on Jul. 25, 2018.

(51) Int. Cl.
*H04W 72/10* (2009.01)
*H04W 72/04* (2009.01)
*H04W 72/12* (2009.01)

(52) U.S. Cl.
CPC ....... *H04W 72/10* (2013.01); *H04W 72/0446* (2013.01); *H04W 72/12* (2013.01)

(58) Field of Classification Search
CPC . H04W 72/0446; H04W 72/10; H04W 72/12; H04W 16/14; H04W 74/0816
See application file for complete search history.

(56) References Cited

U.S. PATENT DOCUMENTS

2010/0195664 A1* 8/2010 Ho .......... H04L 12/413
370/445
2017/0238334 A1* 8/2017 Yang .......... H04W 74/0808
370/336
(Continued)

FOREIGN PATENT DOCUMENTS

WO WO-2016048798 A1 3/2016

OTHER PUBLICATIONS

International Search Report and Written Opinion—PCT/US2019/042977—ISA/EPO—dated Oct. 15, 2019.
(Continued)

*Primary Examiner* — Kevin C. Harper
*Assistant Examiner* — Derrick V Rose
(74) *Attorney, Agent, or Firm* — Loza & Loza, LLP/Qualcomm

(57) ABSTRACT

Aspects directed towards a frame-based equipment (FBE) design for a multi-operator New Radio shared spectrum (NR-SS) are disclosed. In one example, at least one contention slot is monitored within a fixed frame period of an unlicensed spectrum, and a determination is performed of whether a channel reservation signal associated with a higher priority node has been detected within the at least one contention slot. For this example, the at least one contention slot is associated with a resource of a subsequent fixed frame period of the unlicensed spectrum. A determination is then made of whether to transmit communication via the resource. Here, the communication is transmitted via the resource, if the channel reservation signal is not detected, and the communication is not transmitted via the resource, if the channel reservation signal is detected.

30 Claims, 13 Drawing Sheets

(56) References Cited

U.S. PATENT DOCUMENTS

2018/0132140 A1    5/2018    Yoo et al.
2018/0206126 A1    7/2018    Zhang et al.
2018/0343589 A1*  11/2018    Li ......................... H04W 16/14

OTHER PUBLICATIONS

Qualcomm Incorporated: "Deployment Scenarios for NR unlicensed", 3GPP Draft; R1-1802863 7.6.2 Deployment Scenarios for NR Unlicensed, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051398276, 5 pages, Retrieved from the Internet: URL: http://www.3gpp.org/ftp/tsg%5Fran/WG1%5FRL1/TSGR1%5F92/Docs/ [retrieved on Feb. 17, 2018] section 6; pp. 4-5.

Qualcomm Incorporated: "TxOP Frame Structure for NR Unlicensed," 3GPP Draft; R1-1804829 7.6.2 Frame Structure for NR-U Operation, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018, XP051427095, 8 Pages, Retrieved from the Internet: URL: http://www.3gpp.org/ftp/Meetings%5F3GPP%5FSYNC/RAN1/Docs/ [retrieved on Apr. 15, 2018] p. 2, lines 4-14 section 4; pp. 6-7 figure 9.

Samsung: "Discussion on Channel Access Mechanisms for LAA," 3GPP Draft; R1-144739 Discussion On Channel Access Mechanisms for LAA Final, 3RS Generation Partnership Project (3GPP), Mobile Competence Centre; 650, Route Des Lucioles; F-06921 Sophia-Antipolis Cedex, vol. RAN WG1, No. San Francisco, USA; Nov. 17, 2014-Nov. 21, 2014, Nov. 8, 2014, XP050885423, 5 pages, Retrieved from the Internet: URL: http://www.3gpp.org/ftp/tsg_ran/WG1_RL1/TSGR1_79/Docs/ [retrieved on Nov. 8, 2014] p. 2, lines 3-6 figure 1.

Zte: "Frame Structure Design for LAA Considering LBT," 3GPP Draft; R1-144828 Frame Structure Designs for LAA Considering LBT Final, 3rd Generation Partnership Project (3GPP), Mobile Competence Centre; 650, Route Des Lucioles; F-06921 Sophia-Antipolis Cedex, vol. RAN WG1, No. San Francisco, USA; Nov. 17, 2014-Nov. 21, 2014, Nov. 17, 2014, XP050885500, 5 pages, Retrieved from the Internet: URL: http://www.3gpp.org/ftp/tsg_ran/WG1_RL1/TSGR1_79/Docs/section 3; pp. 2-4 figures 1,6.

* cited by examiner

MULTI-OPERATOR SHARED SPECTRUM STRUCTURE COMPATIBLE WITH FRAME-BASED EQUIPMENT

CROSS-REFERENCE TO RELATED APPLICATION(S)

This application claims priority to and the benefit of U.S. Provisional Patent Application No. 62/703,322, filed on Jul. 25, 2018, the entire content of which is incorporated herein by reference as if fully set forth below in its entirety and for all applicable purposes.

TECHNICAL FIELD

The technology discussed below relates generally to wireless communication systems, and more particularly, to a multi-operator New Radio shared spectrum (NR-SS) structure for frame-based equipment (FBE).

INTRODUCTION

As the demand for mobile broadband access continues to increase, research and development continue to advance wireless communication technologies not only to meet the growing demand for mobile broadband access, but to advance and enhance the user experience with mobile communications. The development of 5G New Radio (NR), for example, emerged from the desire to offer next-generation mobile services that meet strict latency, throughput, and reliability performance targets.

As with any mobile wireless system, spectrum is critical to 5G NR. To this end, it is anticipated that 5G NR will operate across a very diverse spectrum, which includes low-band, mid-band, and high-band (mmWave) frequencies. Licensed exclusive use spectrum is generally preferred by mobile operators because it provides greater certainty of performance and reduced risk of interference. Shared spectrum in 5G NR, however, provides new opportunities, both as a complement to exclusive-use licensed spectrum and as a way for non-operator organizations to deploy private networks (e.g., in public venues workplaces, etc.). Accordingly, designing a robust and efficient shared spectrum structure in 5G NR is particularly desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a multi-operator New Radio shared spectrum (NR-SS) structure for frame-based equipment (FBE) are disclosed. In one example, a method is disclosed, which includes monitoring at least one contention slot within a fixed frame period of an unlicensed spectrum, and detecting whether a channel reservation signal associated with a higher priority node is within the at least one contention slot. For this example, the at least one contention slot is associated with a resource of a subsequent fixed frame period of the unlicensed spectrum. The method further includes determining whether to transmit a communication via the resource. Here, the communication is transmitted via the resource, if the channel reservation signal is not detected, and the communication is not transmitted via the resource, if the channel reservation signal is detected.

In another aspect, a wireless communication device is disclosed. The wireless communication device can include a transceiver, a memory, and a processor coupled to the transceiver and the memory, such that the processor and memory are configured to perform various acts. For example, the processor and memory can be configured to monitor at least one contention slot within a fixed frame period of an unlicensed spectrum, and can be further configured to detect whether a channel reservation signal associated with a higher priority node is within the at least one contention slot. For this example, the at least one contention slot is associated with a resource of a subsequent fixed frame period of the unlicensed spectrum. The processor and memory can be configured to initiate transmission of a communication via the resource using the transceiver. Here, the processor and memory can be configured to transmit the communication via the resource, in response to a determination that the channel reservation signal is not detected, and not initiate transmission of the communication via the resource, in response to a determination that the channel reservation signal is detected.

In a further aspect, an apparatus for wireless communication is disclosed. The apparatus can include each of a means for monitoring, a means for detecting circuitry, and a means for determining. For this example, the means for monitoring can be configured to monitor at least one contention slot within a fixed frame period of an unlicensed spectrum, whereas the means for detecting can be configured to detect whether a channel reservation signal associated with a higher priority node is within the at least one contention slot. For this example, the at least one contention slot is associated with a resource of a subsequent fixed frame period of the unlicensed spectrum. The means for determining can be configured to determine whether to transmit a communication via the resource. Here, the means for determining is configured to transmit the communication via the resource, if the channel reservation signal is not detected, and the means for determining is configured to not transmit the communication via the resource, if the channel reservation signal is detected.

In yet another aspect, a non-transitory computer-readable medium storing computer-executable code is disclosed, which includes code for causing a wireless communication device to perform various acts. For instance, the non-transitory computer-readable medium may include code for causing the wireless communication device to monitor at least one contention slot within a fixed frame period of an unlicensed spectrum, and detect whether a channel reservation signal associated with a higher priority node is within the at least one contention slot. For this example, the at least one contention slot is associated with a resource of a subsequent fixed frame period of the unlicensed spectrum. The non-transitory computer-readable medium may further include code for causing the wireless communication device to determine whether to transmit a communication via the resource. Here, the communication is transmitted via the resource, if the channel reservation signal is not detected, and the communication is not transmitted via the resource, if the channel reservation signal is detected.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
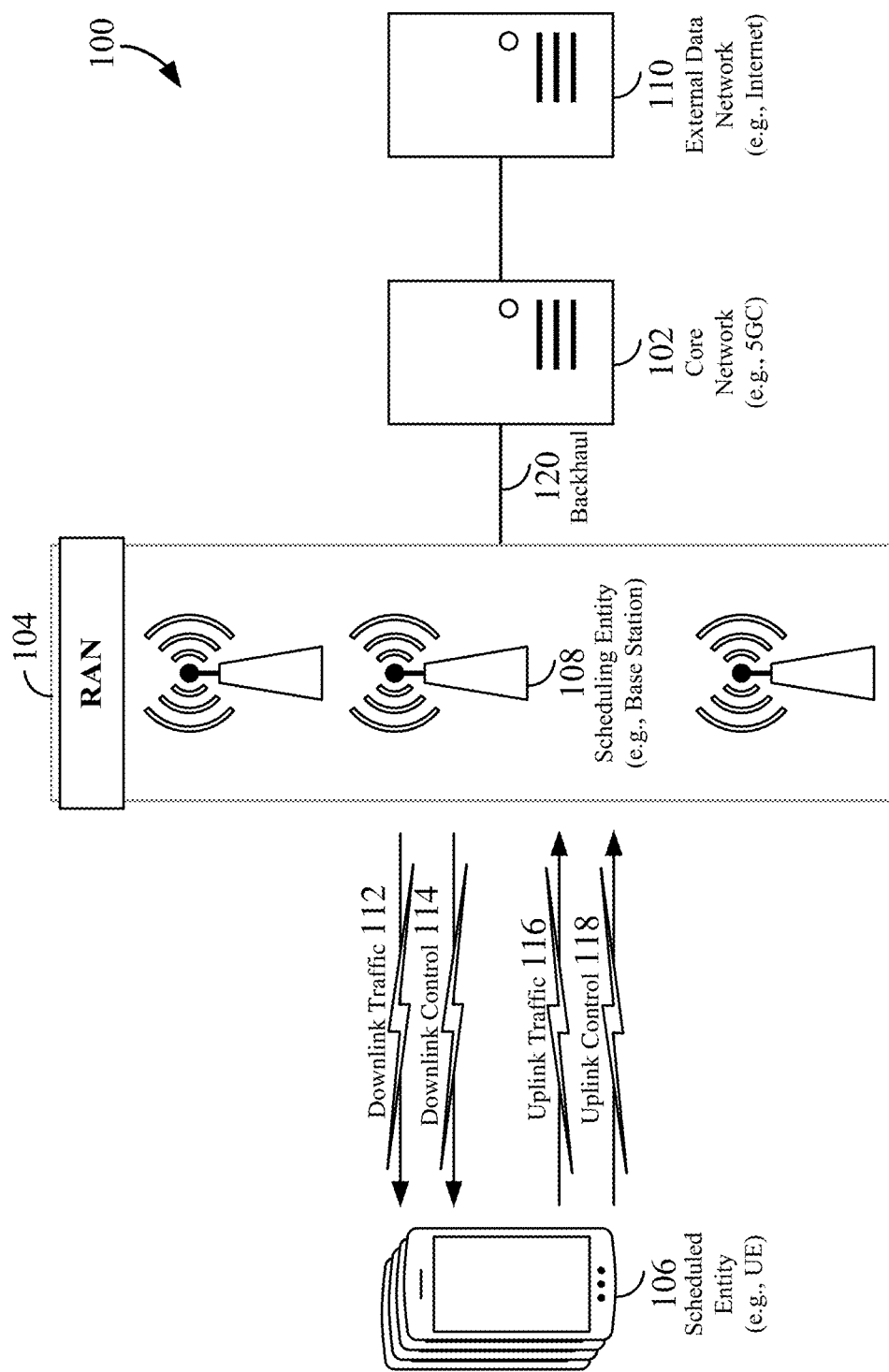
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are directed towards a multi-operator New Radio shared spectrum (NR-SS) structure for frame-based equipment (FBE). As used herein, it should be appreciated that an FBE is defined as equipment where the transmit/receive structure is not directly demand-driven but has fixed timing. To this end, it is noted that a single operator NR-SS structure for FBE would require minimal change from NR. For multi-operator NR-SS, however, several additional features should be considered. For instance, it is generally desirable for such design to provide synchronous operation across operators (i.e., not only OFDM symbol level or slot level synchronization, but also access level synchronization). For fairness, it would also be desirable to provide operators with a randomized operator level priority.

Since the current NR-SS structure is not compatible with a load-based equipment (LBE) design (as used herein, an LBE is defined as equipment where the transmit/receive structure is not fixed in time but demand-driven), aspects disclosed herein are directed towards a multi-operator NR-SS structure compatible with an FBE design. In a particular aspect disclosed herein, since the current NR-SS structure is not fully compatible with FBE, as presently regulated, a new NR-SS structure is proposed for FBE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
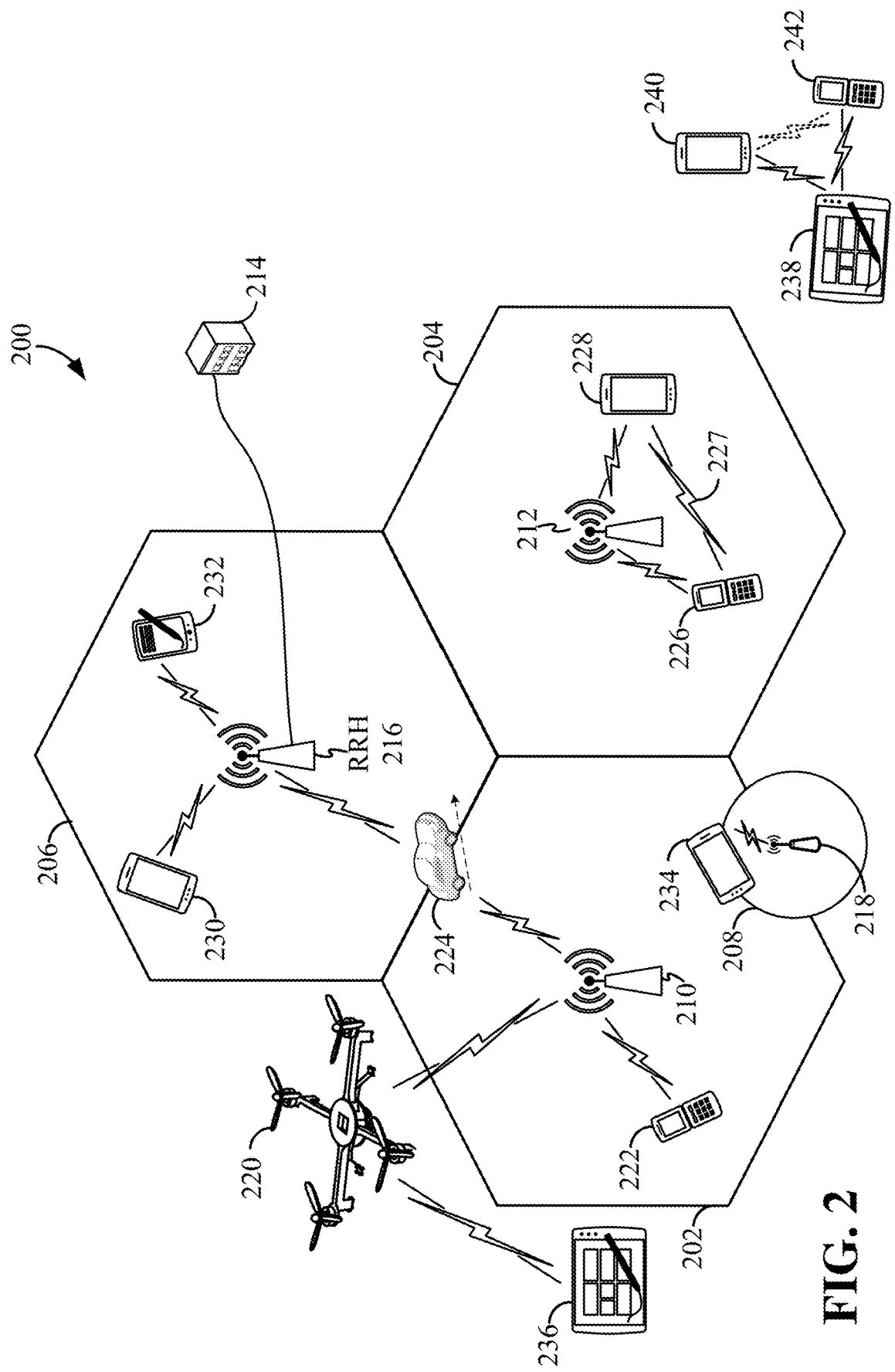
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
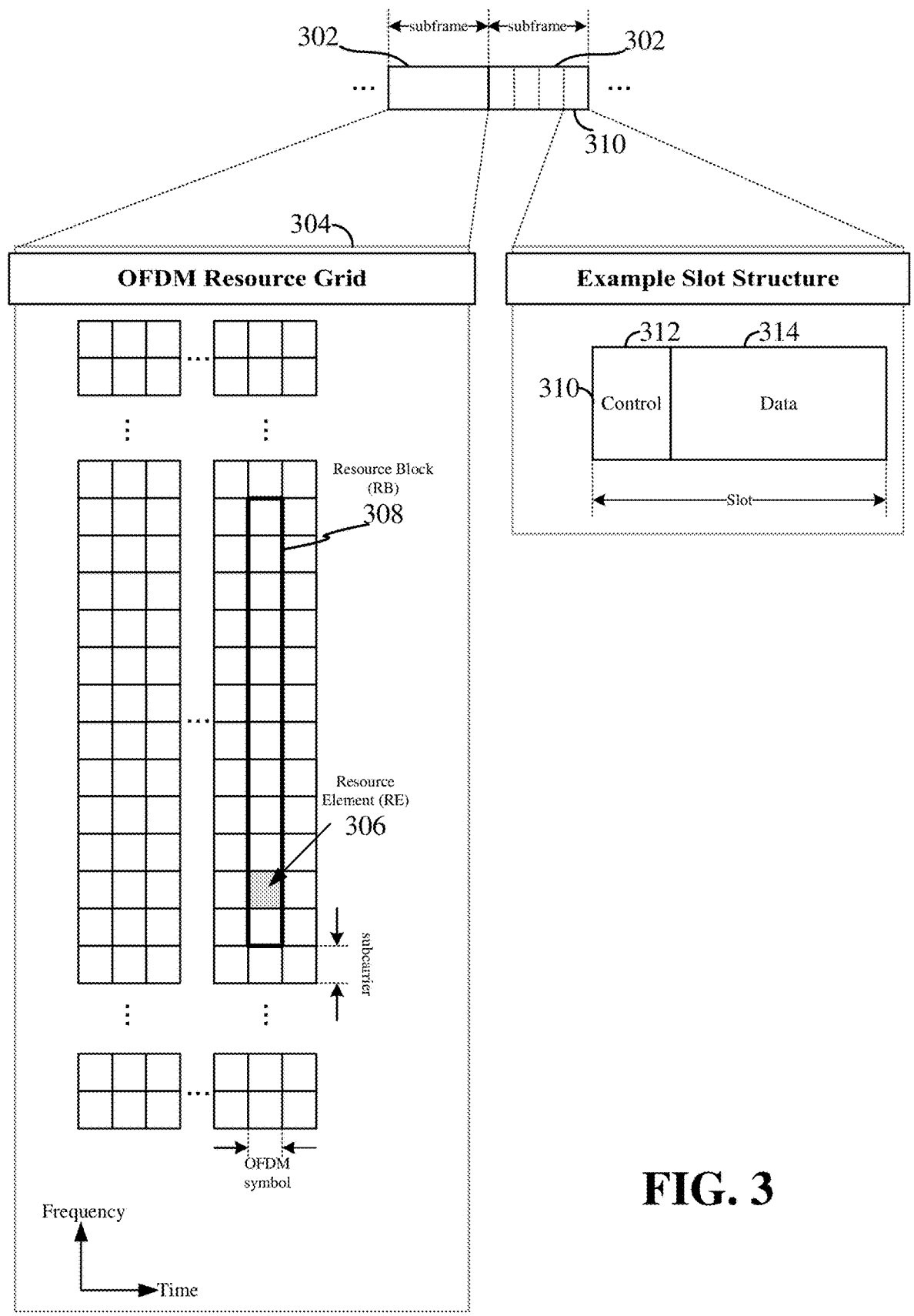
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

As previously stated, since the current New Radio shared spectrum (NR-SS) structure is not compatible with a load-based equipment (LBE) design, aspects disclosed herein are directed towards a multi-operator NR-SS structure compatible with a frame-based equipment (FBE) design. For reference, an illustration of the current multi-operator NR-SS structure is provided in FIG. 4. For this particular example, it is assumed that two operators, operator 420 and operator 430, may contend with each other for channel occupancy time (CoT) 404 within fixed frame period 400, and for channel occupancy time (CoT) 414 within fixed frame period 410. Here, although this example assumes that each of fixed frame period 400 and 410 are equivalent to an NR frame (i.e., with a duration of 10 ms, and comprising 10 subframes of 1 ms each), it should be appreciated that a "fixed frame period" may vary according to the particular radio access technology (RAT) that is used. It is further assumed that operator 420 and/or operator 430 can generally be either a scheduling entity (e.g., a gNB) and/or a scheduled entity (e.g., a UE).

Here, it should be appreciated that operator 420 and operator 430 are each guaranteed a CoT in a rotating fashion. If a guaranteed CoT is not used by that operator, however, the CoT becomes an opportunistic resource for the other operator to use. For instance, in FIG. 4, it is assumed that operator 420 is guaranteed CoT 404 within fixed frame period 400, whereas operator 430 is guaranteed CoT 414 within fixed frame period 410. Within contention slots 402, the slot corresponding to operator 420 thus has priority over the slot corresponding to operator 430, as shown. This priority is then rotated in contention slots 412 where the slot corresponding to operator 430 has a higher priority than the slot corresponding to operator 420.

Figure 4:
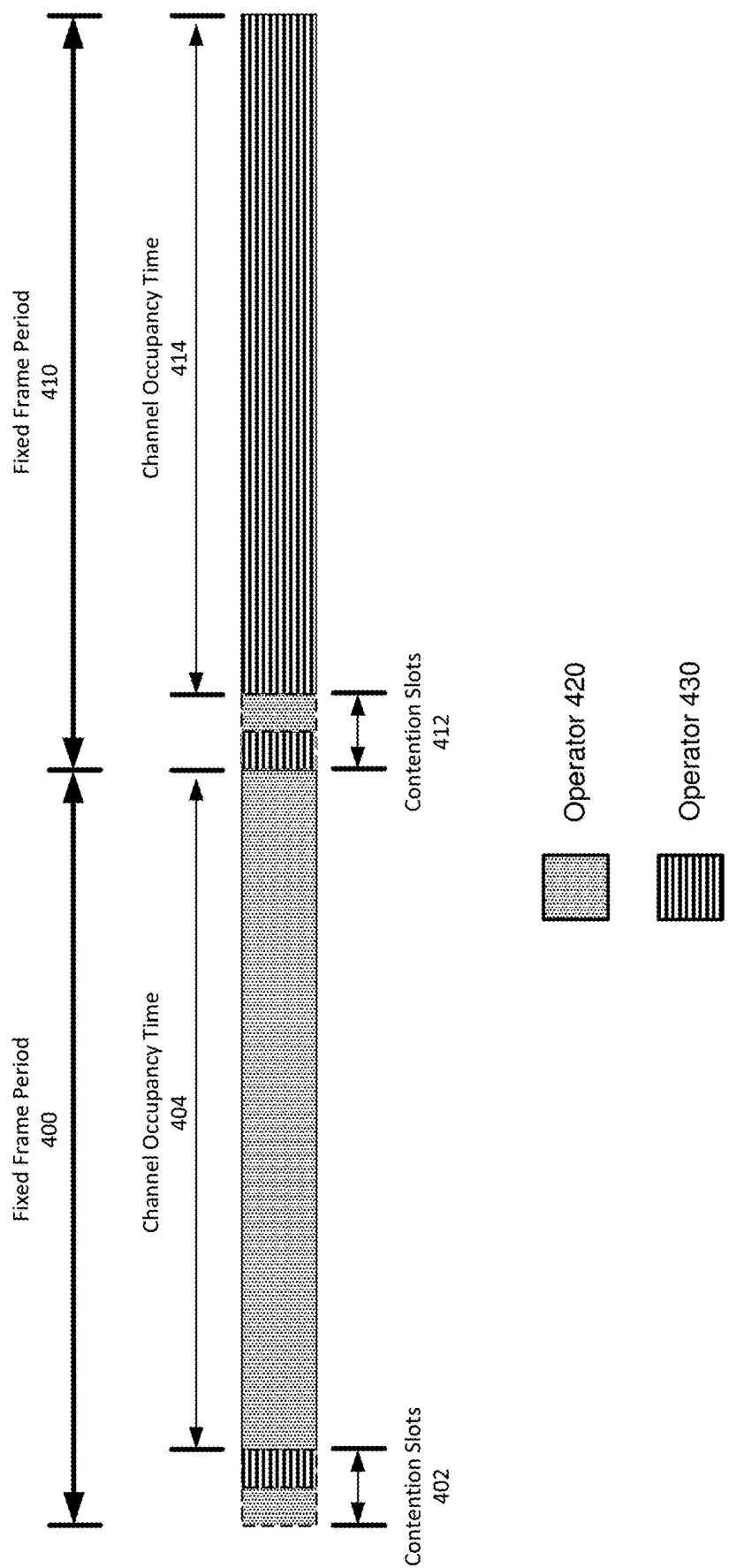
FIG. 4 is an illustration of the current multi-operator New Radio shared spectrum (NR-SS) structure.
Figure 5:
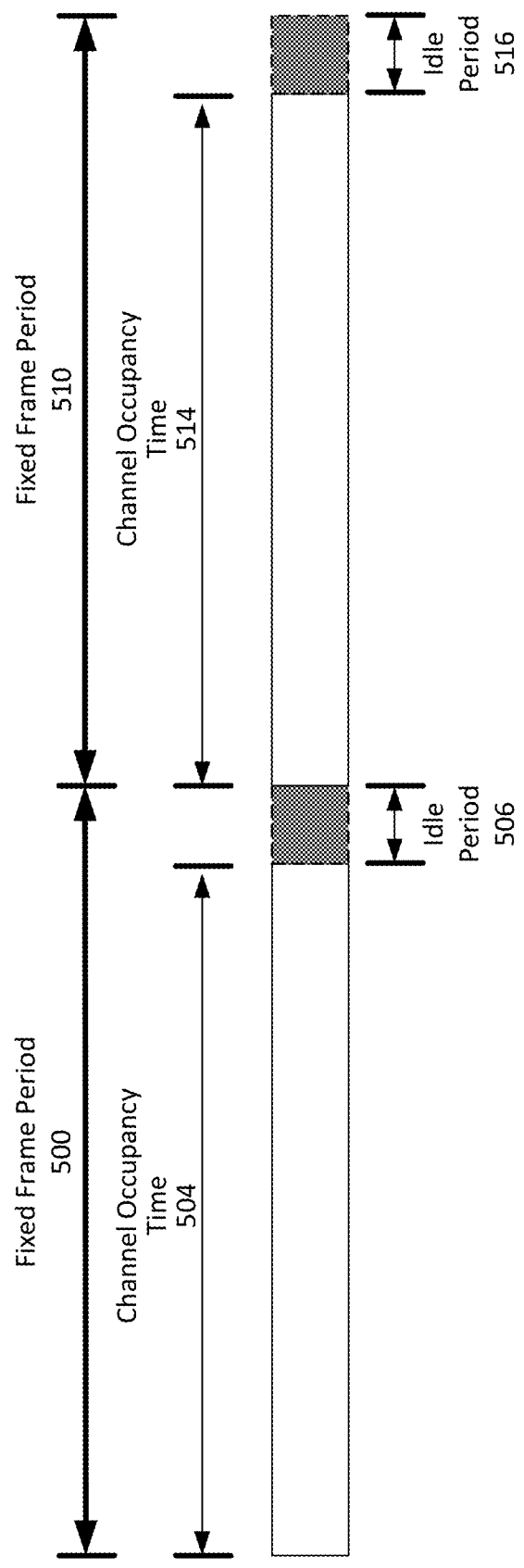
FIG. 5 is an illustration of an exemplary frame-based equipment (FBE) structure.

It should be noted that the NR-SS structure illustrated in FIG. 4 is not fully compatible with FBE, as presently regulated. For reference, an exemplary illustration of an FBE structure, as presently regulated, is provided in FIG. 5. As illustrated, fixed frame period 500 includes CoT 504 and idle period 506, whereas fixed frame period 510 includes CoT 514 and idle period 516. As presently regulated, an idle period (e.g., idle period 506 or idle period 516) cannot be shorter than 5% of its corresponding fixed frame period (e.g., fixed frame period 500 or fixed frame period 510), and a CoT (e.g., CoT 504 or CoT 514) cannot be longer than 95% of its corresponding fixed frame period (e.g., fixed frame period 500 or fixed frame period 510). Also, per FBE regulation, a one shot Listen-Before-Talk (LBT) operation is needed in an idle period (e.g., idle period 506 or idle period 516) before beginning a subsequent CoT (e.g., a one shot LBT is needed in idle period 506 before beginning CoT 514). According to FBE regulation, multiple segments of a CoT (e.g., CoT 504 or CoT 514) with one shot LBT functionality are allowed in the front of the CoT.

In attempting to modify the current multi-operator NR-SS structure to be compatible with an FBE, as presently regulated, several issues should be addressed. For instance, an FBE compatible NR-SS structure should include idle periods, which are lacking in the current NR-SS structure. Also, with the current multi-operator NR-SS structure, the transmission starting time is not accurately periodic for each operator. For instance, although randomization helps with fairness, it also creates irregularity. Such irregularity is typically handled by loosely interpreting conformance tests, but there is no conformance test that enforces having a transmission start immediately after an idle period, although it is specified by regulation.

Figure 6:
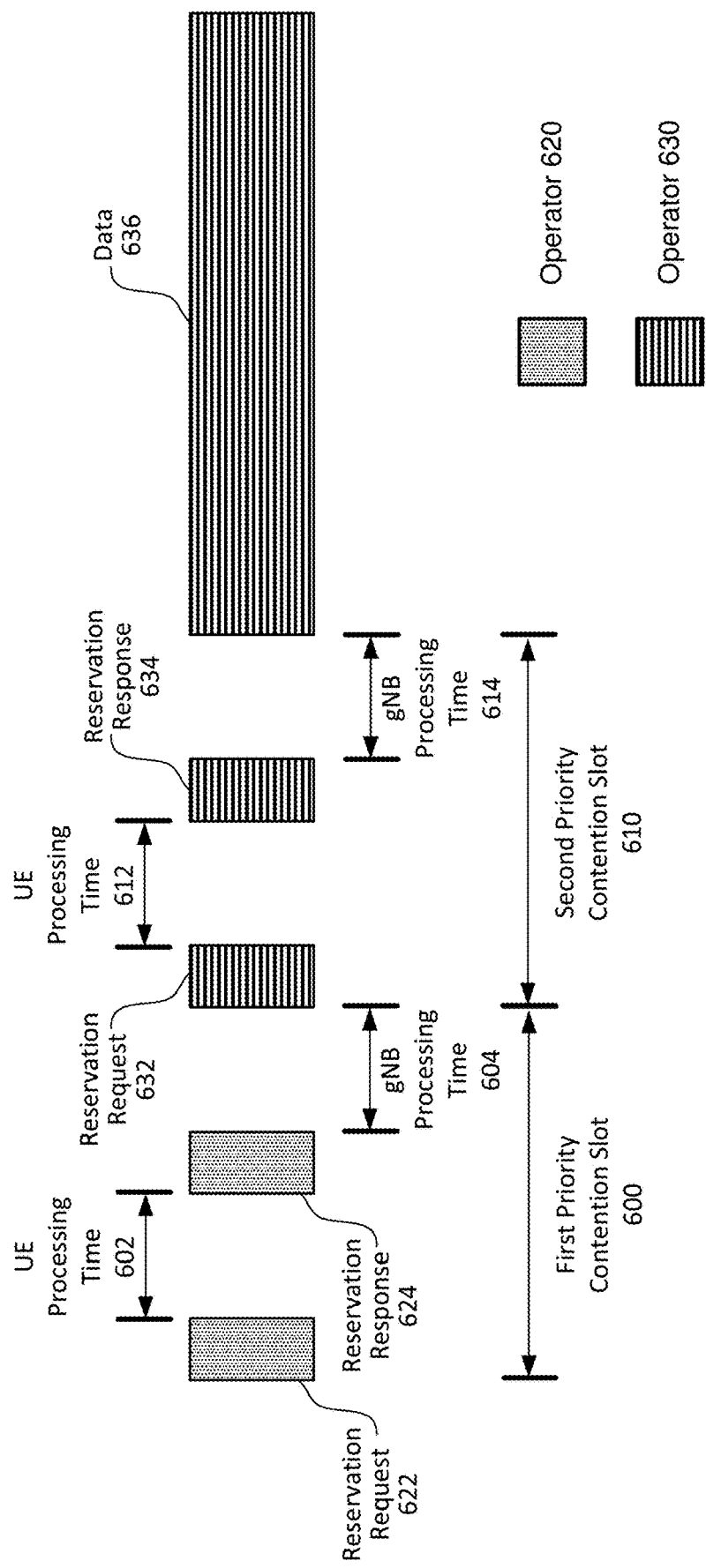
FIG. 6 is an illustration of reservation requests and reservation responses within an exemplary multi-operator NR-SS structure.

Problems with the current multi-operator NR-SS structure also include problems associated with processing a reservation request (RRQ) and/or a reservation response (RRS). Namely, when there are multiple operators in NR-SS, problems arise from the processing time needed for multiple RRQ/RRS rounds in a contention slot. For reference, an illustration of RRQs and RRSs within an exemplary multi-operator NR-SS structure is provided in FIG. 6. Here, it is assumed that operator 620 has a higher priority than operator 630. Within the first priority contention slot 600, operator 620 thus has a corresponding RRQ 622 and RRS 624, whereas the second priority contention slot 610 is associated with operator 630 and includes RRQ 632 and RRS 634. As illustrated, having operator 630 transmit data 636 involves processing RRQ 622, RRS 624, RRQ 632, and RRS 634, wherein the processing of each has a corresponding processing time. For this particular example, a UE processing time 602 is associated with processing RRQ 622, a gNB processing time 604 is associated with processing RRS 624, a UE processing time 612 is associated with processing RRQ 632, a gNB processing time 614 is associated with processing RRS 634.

Figure 7:
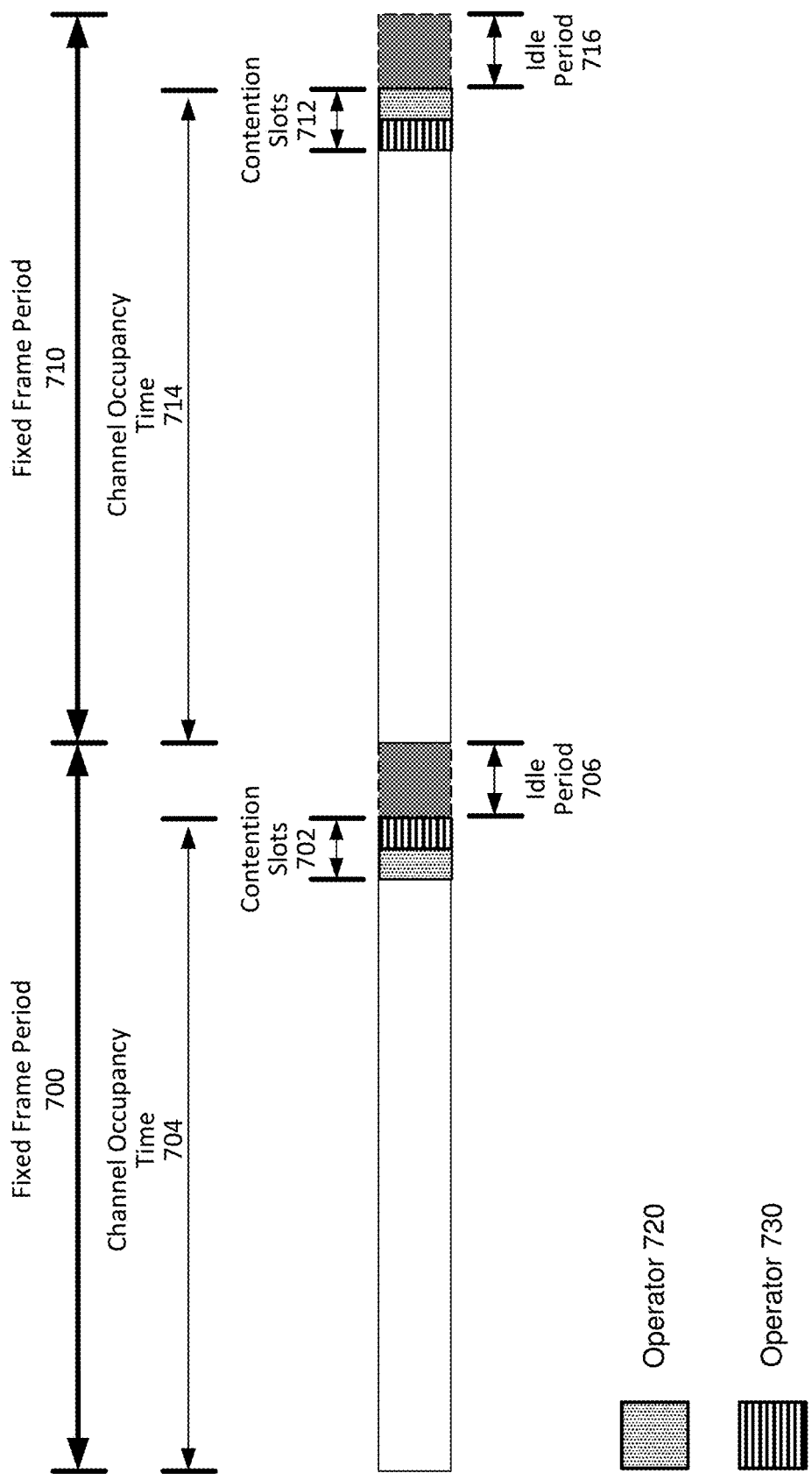
FIG. 7 illustrates an exemplary FBE design for a multi-operator NR-SS in accordance with aspects disclosed herein.

In an aspect disclosed herein, a new multi-operator NR-SS structure is proposed, which is compatible with an FBE structure, as presently regulated, and addresses the aforementioned issues with the current multi-operator NR-SS structure. In a particular implementation, the contention of a CoT is moved to the fixed frame period of a previous CoT. For instance, with reference to FIG. 7, an exemplary FBE compatible design for a multi-operator NR-SS is provided, wherein it is assumed that the contention for CoT 714 between operator 720 and operator 730 is performed according to the contention slots 702 associated with the previous CoT 704, and wherein it is further assumed that contention slots 702 are NR slots. For this particular example, contention slots 702 are included immediately before the idle period 706 of fixed frame period 700, and contention slots 712 are included immediately before the idle period 716 of fixed frame period 710. Here, it should be appreciated that the idle periods 706 and 716 illustrated in FIG. 7 are substantially similar to the idle periods 506 and 516 illustrated in FIG. 5, wherein it is contemplated that idle periods 706 and 716 in an exemplary implementation are not shorter than 5% of their corresponding fixed frame periods (e.g., fixed frame period 700 or fixed frame period 710). The time allocated for transmitting data via CoT 704 or CoT 714 is thus shrunk relative to the current multi-operator NR-SS structure in order to accommodate for contention slots 702 and contention slots 712. To this end, it is contemplated that the duration of a CoT (e.g., CoT 704 or CoT 714) may be equal to the difference between the duration of the fixed frame period (e.g., fixed frame period 700 or fixed frame period 710) and the combination of the respective durations of both the idle period (e.g., idle period 706 and idle period 716) and each of the contention slots (e.g., contention slots 702 and contention slots 712). By placing the contention slots immediately before the idle periods, the multi-operator NR-SS structure disclosed herein provides the fastest response and avoids interrupting CoT traffic (i.e., effectively resulting in a larger idle period). With this structure, it should also be noted that, if a previous CoT is not occupied by a higher priority operator, RRQ/RRS transmissions can be interpreted as short control signaling transmissions, which are not subject to a clear channel assessment (CCA). Moreover, if a first operator detects that a current CoT is not occupied by a second operator having a higher priority to a subsequent CoT (e.g., if operator 730 detects that operator 720 does not occupy CoT 704), the first operator essentially becomes the highest priority operator for the subsequent CoT. If so, the first operator may thus transmit RRQ/RRS signals via the contention slots of the current fixed frame period (e.g., via contention slots 702) as a control signal indicating that the first operator will utilize the subsequent CoT (e.g., indicating that operator 730 will utilize CoT 714, since operator 720 did not occupy CoT 704, and thus could not transmit RRQ/RRS signals via contention slots 702).

In FIG. 7, although contention slots 702 and contention slots 712 each show two slots (i.e., one for operator 720 and one for operator 730), it is contemplated that only one contention slot may be needed for two operators, since the higher priority node does not need to monitor a contention slot for a lower priority node. Namely, if a lower priority node does not detect an RRQ/RRS associated with a higher priority node, there is no need transmit an RRQ/RRS associated with the lower priority node. During operation, the higher priority node of one CoT (e.g., operator 720 is the higher priority node of CoT 704) will send its RRQ/RRS in the corresponding contention slot of the CoT (e.g., contention slot 702) if it intends to occupy the subsequent CoT (e.g., CoT 714). Meanwhile, the lower priority node of one CoT (e.g., operator 730 is the lower priority node of CoT 704) will monitor the RRQ/RRS in the corresponding contention slot of the CoT (e.g., contention slot 702) to see if the lower priority node (e.g., operator 730) can transmit during a subsequent CoT (e.g., CoT 714), wherein the idle period of the current fixed frame period can be used to process RRQ/RRS signals received via the contention slot (e.g., where idle period 706 of fixed frame period 700 is used to process RRQ/RRS signals received via contention slot 702).

Aspects of the multi-operator NR-SS structure disclosed herein are now described for configurations having more than two operators. Similar to the two-operator configuration above, configurations where there are more than two operators do not require a contention slot for each operator, since the node having the least priority in a particular fixed frame period does not need a contention slot (i.e., if there are N operators, only N-1 contention slots are needed). Moreover, every node that intends to occupy a particular CoT, except the least priority node, will send an RRQ/RRS via their corresponding contention slot.

It is also contemplated that the transmission of RRQ/RRS may not need to depend on the non-detection of a higher priority operator RRQ/RRS. Namely, it is contemplated that RRQ/RRS transmissions can be made by an operator before RRQ/RRS transmissions from other operators are processed, which reduces the aforementioned processing delay requirement discussed with reference to FIG. 6. Within such implementation, the operator may be configured to operate in a "receive" mode in contention slots belonging to other operators. Moreover, a node only needs to receive the contention slots from operators with higher priority. The processing is also delayed until the idle period, or more accurately, after the node's own contention slot.

Contention slot details of the multi-operator NR-SS structure disclosed herein are now discussed. As previously stated, it is contemplated that the transmission of contention slots within one fixed frame period will correspond to the CoT of a subsequent fixed frame period. Such transmissions may be interpreted as short control signaling, and can be conditioned on one-shot LBT, although not required by regulation. It is also contemplated that a previous CoT should leave space for contention slot transmissions.

In a particular aspect of the multi-operator NR-SS structure disclosed herein, it is assumed that contention slots include channel reservation signals (e.g., RRQ/RRS transmissions) similar to the current NR-SS structure. Effectively, a contention slot is thus formed by two discontinuous transmissions (e.g., an RRQ transmission and an RRS transmission). It is further contemplated that, since an RRS is triggered by an RRQ, there is no need for processing time in between.

Figure 8:
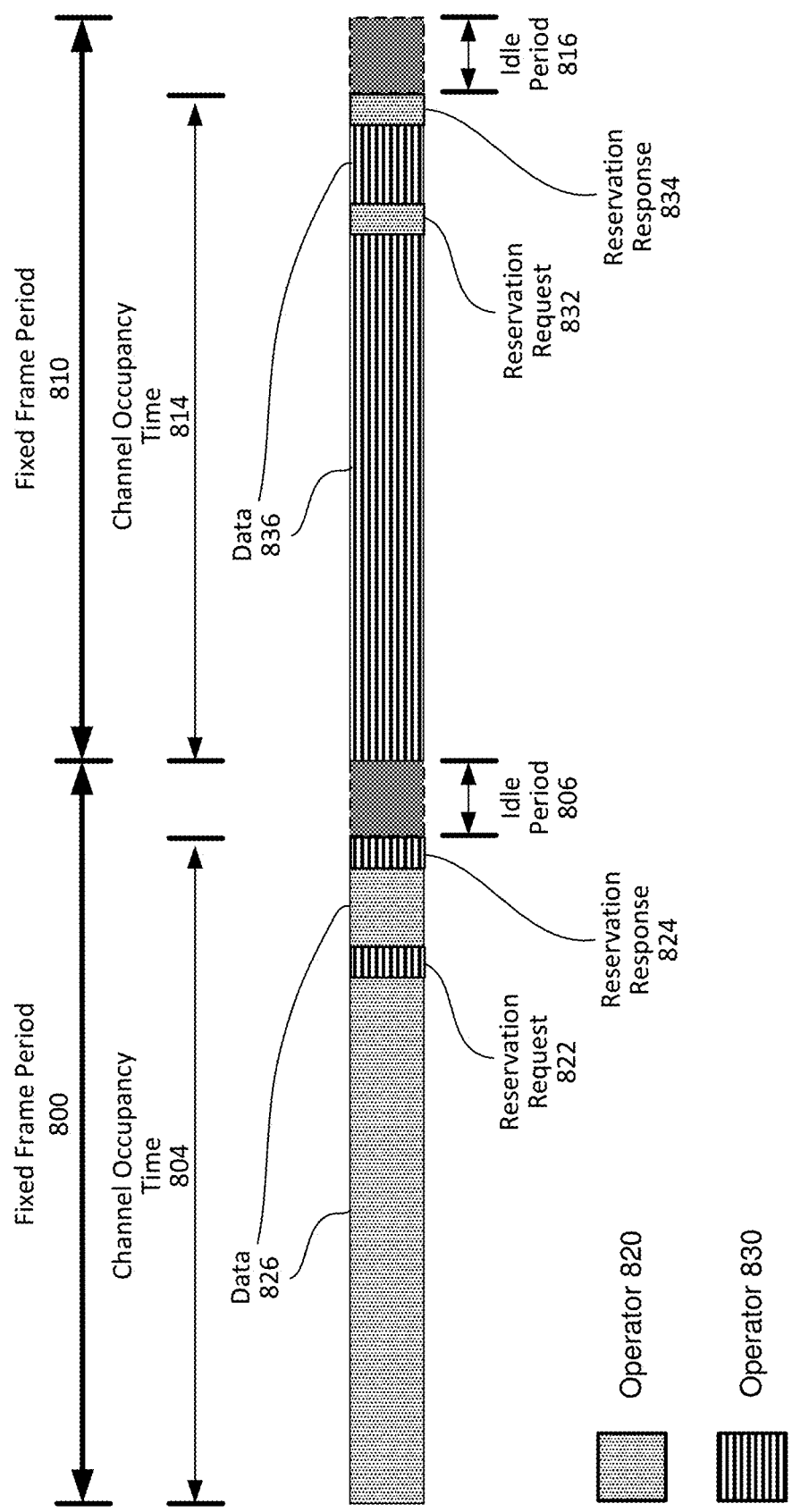
FIG. 8 illustrates reservation requests and reservation responses within an exemplary multi-operator NR-SS in accordance with a first FBE design disclosed herein.

Particular designs are disclosed herein, however, in order to provide adequate gaps for the processing delay. For instance, with respect to the single contention slot case, separate RRQ and RRS gaps can be left in a previous CoT, at the cost of needing an extra LBT gap when the CoT owner reuses the transmission after the RRQ/RRS gap (i.e., because, per FBE regulation, a one shot LBT operation is needed in an idle period before beginning a subsequent CoT). An illustration of these RRQ/RRS gaps is provided in FIG. 8, wherein operator 820 transmits data 826 within CoT 804 of fixed frame period 800, and wherein operator 830 transmits data 836 within CoT 814 of fixed frame period 810. In this example, operator 830 sends each of RRQ 822 and RRS 824 before idle period 806, as shown, in order to transmit data 836 within CoT 814. Similarly, operator 820 sends each of RRQ 832 and RRS 834 before idle period 816, as shown, in order to transmit data within a subsequent CoT (i.e., the CoT after CoT 814).

Figure 9:
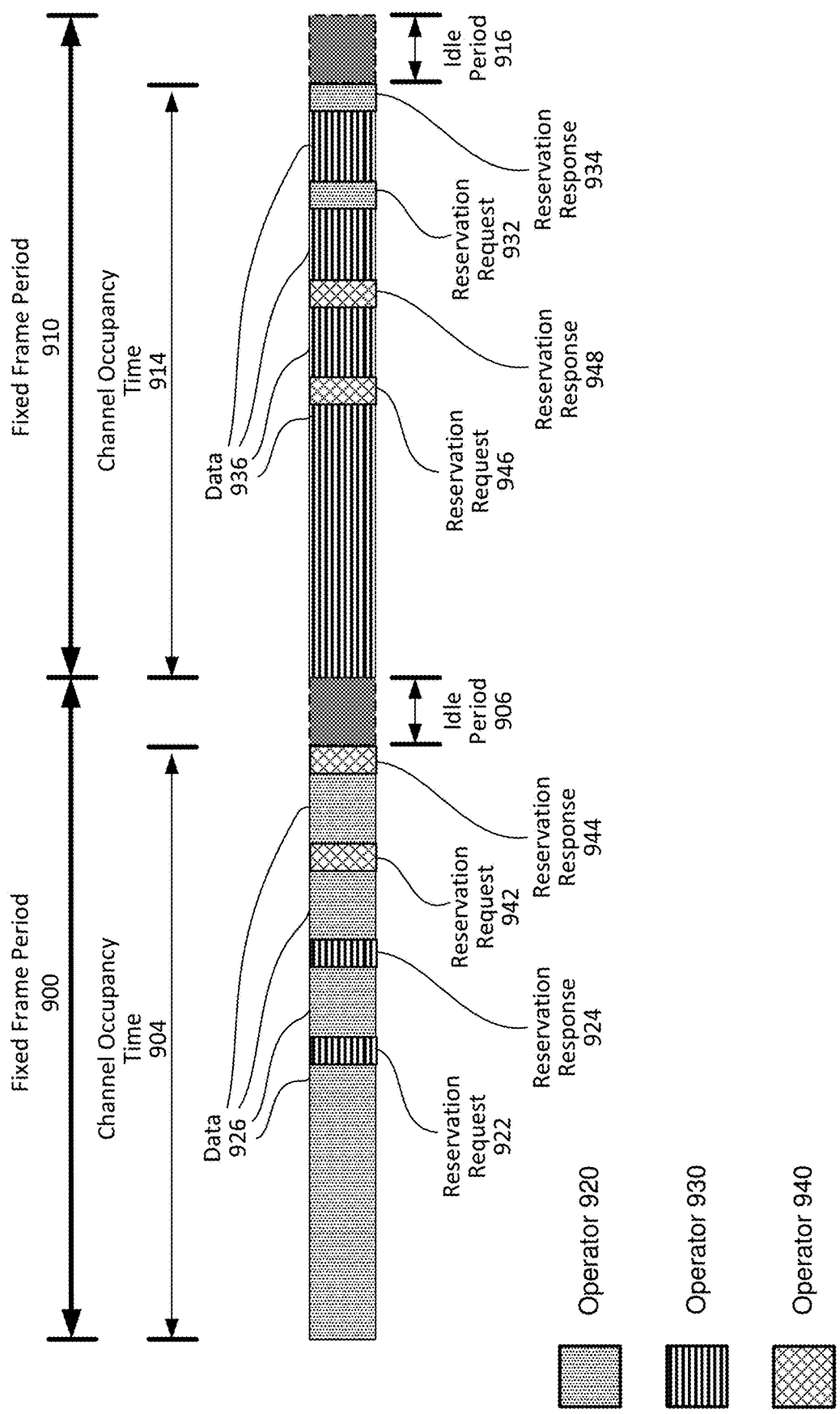
FIG. 9 illustrates reservation requests and reservation responses within an exemplary multi-operator NR-SS in accordance with a second FBE design disclosed herein.

With respect to a multiple contention slots case (i.e., more than two operators), it is contemplated that a similar RRQ/RRS gap scheme may be implemented, wherein more RRQ/RRS rounds are included. An exemplary implementation of such design is illustrated in FIG. 9, wherein operator 920 transmits data 926 within CoT 904 of fixed frame period 900, and wherein operator 930 transmits data 936 within CoT 914 of fixed frame period 910. In this example, operator 930 sends each of RRQ 922 and RRS 924 before idle period 906, as shown, in order to transmit data 936 within CoT 914. Here, however, it is assumed that operator 940 is also included, wherein operator 930 has the highest priority for CoT 914, operator 940 has the next highest priority for CoT 914, and operator 920 has the lowest priority for CoT 914. Therefore, because operator 920 is the lowest priority operator for CoT 914, the previous CoT 904 only needs space for RRQ 922 and RRS 924, which correspond to operator 930, and RRQ 942 and RRS 944, which correspond to operator 940.

Similarly, operator 940 sends each of RRQ 946 and RRS 948 before idle period 916, as shown, in order to transmit data within a subsequent CoT (i.e., the CoT after CoT 914). Here, however, it is assumed that operator 940 has the highest priority for the CoT after CoT 914, operator 920 has the next highest priority, and operator 930 has the lowest priority. Therefore, because operator 930 is the lowest priority operator for the CoT after CoT 914, CoT 914 only needs space for RRQ 946 and RRS 948, which correspond to operator 940, and RRQ 932 and RRS 934, which correspond to operator 920.

An alternative design for the multiple contention slots case is also disclosed in which consecutive multiple RRQs are followed by consecutive multiple RRSs. An example of this design is provided in FIG. 10, wherein operator 1020 transmits data 1026 within CoT 1004 of fixed frame period 1000, and wherein operator 1030 transmits data 1036 within CoT 1014 of fixed frame period 1010. In this example, operator 1030 sends each of RRQ 1022 and RRS 1024 before idle period 1006, as shown, in order to transmit data 1036 within CoT 1014. Similar to FIG. 9, however, it is assumed that operator 1040 is also included, wherein operator 1030 has the highest priority for CoT 1014, operator 1040 has the next highest priority for CoT 1014, and operator 1020 has the lowest priority for CoT 1014. Therefore, because operator 1020 is the lowest priority operator for CoT 1014, the previous CoT 1004 only needs space for RRQ 1022 and RRS 1024, which correspond to operator 1030, and RRQ 1042 and RRS 1044, which correspond to operator 1040.

Similarly, operator 1040 sends each of RRQ 1046 and RRS 1048 before idle period 1016, as shown, in order to transmit data within a subsequent CoT (i.e., the CoT after CoT 1014). Here, however, it is assumed that operator 1040 has the highest priority for the CoT after CoT 1014, operator 1020 has the next highest priority, and operator 1030 has the lowest priority. Therefore, because operator 1030 is the lowest priority operator for the CoT after CoT 1014, CoT 1014 only needs space for RRQ 1046 and RRS 1048, which correspond to operator 1040, and RRQ 1032 and RRS 1034, which correspond to operator 1020.

Figure 10:
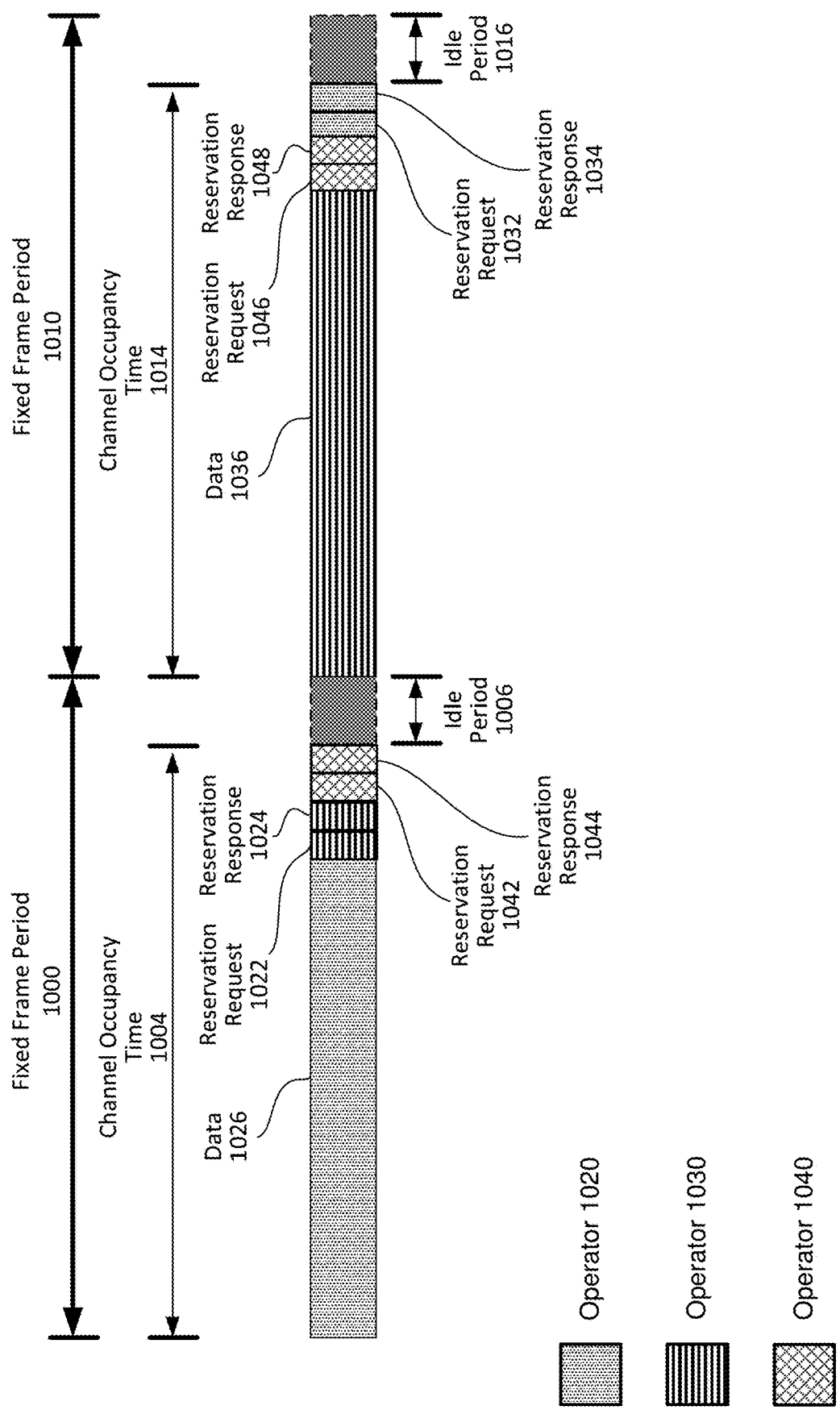
FIG. 10 illustrates reservation requests and reservation responses within an exemplary multi-operator NR-SS in accordance with a third FBE design disclosed herein.

With the design illustrated in FIG. 10, it should be appreciated that an operator may use the RRQ/RRS transmission time of the other operators as their processing time. This implies that that there can be RRQ/RRS transmissions from multiple operators, since a lower priority node may transmit its own RRQ/RRS before processing an earlier transmitted RRQ/RRS from a higher priority node. It should also be noted that, although putting RRQs and RRSs back to back is not always necessary, such design helps to reduce the number of LBT gaps needed for a CoT owner to resume transmission. Also, although putting RRQs and RRSs at the end of a CoT is not always necessary, such design allows for a decision regarding contention to be performed later.

Figure 11:
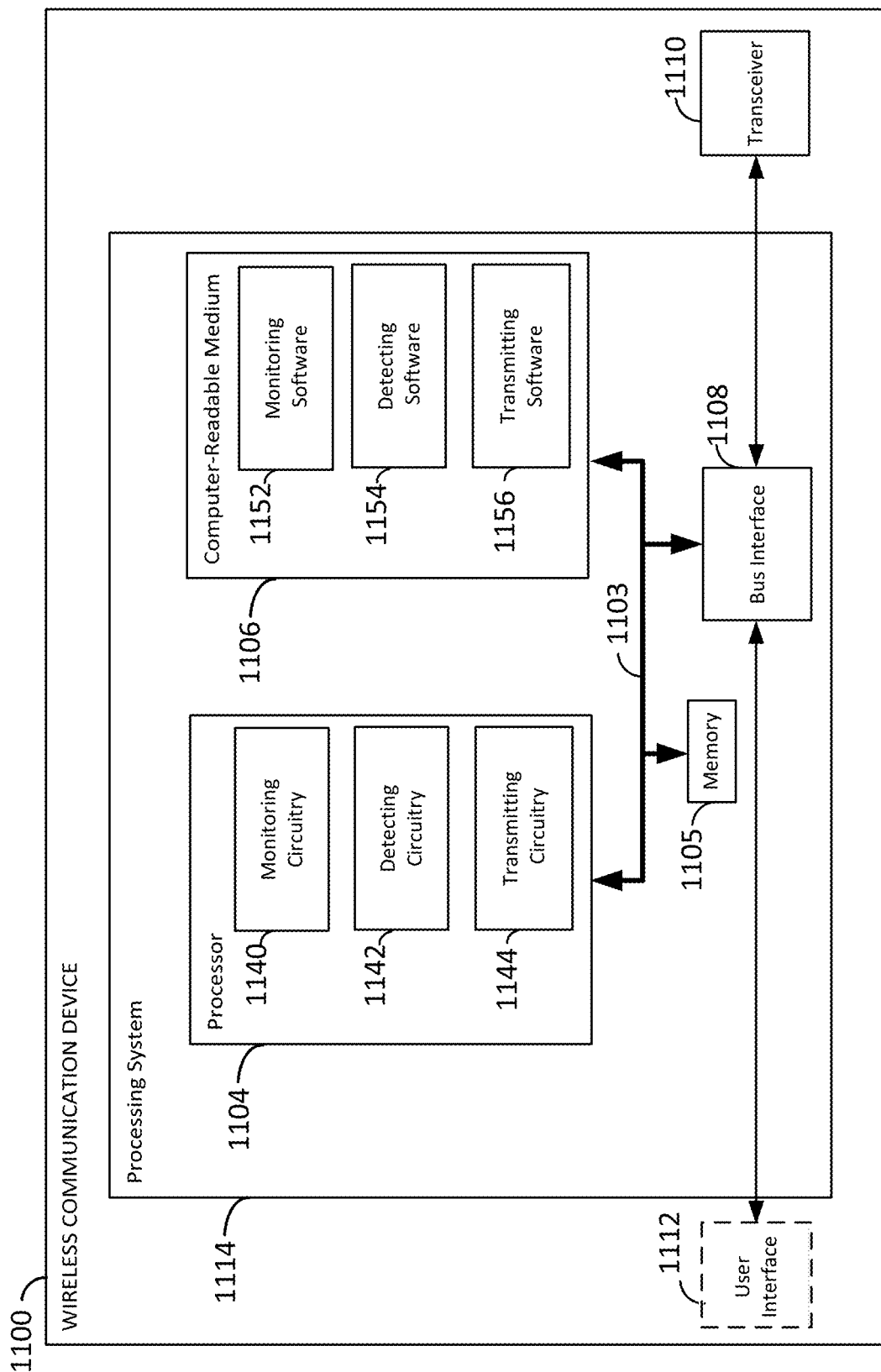
FIG. 11 is a block diagram illustrating an example of a hardware implementation for a wireless communication device employing a processing system in accordance with aspects disclosed herein.

FIG. 11 is a block diagram illustrating an example of a hardware implementation for a wireless communication device 1100 employing a processing system 1114. For example, the wireless communication device 1100 may be a UE as illustrated in any one or more of the FIGs. disclosed herein. In another example, the wireless communication device 1100 may be a base station (e.g., a gNB) as also illustrated in any one or more of the FIGs. disclosed herein. Accordingly, it should be appreciated that the wireless communication device 1100 is a node that may be configured as either a UE or a gNB, wherein the wireless communication device 1100 may be configured to transmit/receive an RRQ or transmit/receive an RRS in accordance with aspects disclosed herein.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in a wireless communication device 1100, may be used to implement any one or more of the processes and procedures described below and illustrated in FIG. 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided.

In some aspects of the disclosure, the processor 1104 may include a monitoring circuitry 1140 configured for various functions, including, for example, to monitor at least one contention slot within a fixed frame period of an unlicensed spectrum. Here, it is contemplated that the at least one contention slot is associated with a resource of a subsequent fixed frame period of the unlicensed spectrum. It is also contemplated that the monitoring circuitry 1140 may be configured to monitor the at least one contention slot when the wireless communication device 1100 is a lesser priority node of the fixed frame period (i.e., only if the wireless communication device 1100 is not the highest priority node of the fixed frame period). As illustrated, the processor 1104 may also include a detecting circuitry 1142 configured for various functions. For instance, the detecting circuitry 1142 may be configured to detect whether a channel reservation signal associated with a higher priority node is within the at least one contention slot. For instance, it is contemplated that such channel reservation signal may be at least one of an RRQ or an RRS. The processor 1104 may further include transmitting circuitry 1144 configured for various functions, including, for example, to determine whether to transmit a communication via the resource. Here, it is contemplated that the transmitting circuitry 1144 may be configured to transmit the communication via the resource, if the channel reservation signal is not detected, and configured to not transmit the communication via the resource, if the channel reservation signal is detected. It should also be appreciated that, the combination of the monitoring circuitry 1140, the detecting circuitry 1142, and the transmitting circuitry 1144 may be configured to implement one or more of the functions described herein.

Various other aspects for wireless communication device 1100 are also contemplated. For instance, it is contemplated that the fixed frame period comprises a CoT, an idle period, and the at least one contention slot monitored by the monitoring circuitry 1140. Within such implementation, it is further contemplated that the at least one contention slot may be placed before the idle period. In a particular implementation, the at least one contention slot is placed immediately before the idle period.

Various aspects for contending for the resource of the subsequent fixed frame period are also contemplated. For instance, the transmitting circuitry 1144 may be further configured to contend for the resource of the subsequent fixed frame period via a channel reservation signal transmission transmitted in the fixed frame period. Within such implementation, it is then further contemplated that the contending performed by the transmitting circuitry 1144 may be based on a priority of the wireless communication device 1100. For instance, the transmitting circuitry 1144 may be configured to perform the contending when the wireless communication device 1100 is a higher priority node of the fixed frame period (i.e., only if the wireless communication device 1100 is not the lowest priority node of the fixed frame period). It is also contemplated that the transmitting circuitry 1144 may be configured to transmit the contending channel reservation signal before processing the channel reservation signal associated with the higher priority node, which results in multiple nodes respectively transmitting multiple channel reservation signals within the fixed frame period.

Referring back to the remaining components of wireless communication device 1100, it should be appreciated that the processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include monitoring software 1152 configured for various functions, including, for example, to monitor at least one contention slot within a fixed frame period of an unlicensed spectrum. Here, it is contemplated that the at least one contention slot is associated with a resource of a subsequent fixed frame period of the unlicensed spectrum. It is also contemplated that the monitoring software 1152 may be configured to monitor the at least one contention slot when the wireless communication device 1100 is a lesser priority node of the fixed frame period (i.e., only if the wireless communication device 1100 is not the highest priority node of the fixed frame period). As illustrated, the computer-readable storage medium 1106 may also include a detecting software 1154 configured for various functions. For instance, the detecting software 1154 may be configured to detect whether a channel reservation signal associated with a higher priority node is within the at least one contention slot. For instance, it is contemplated that such channel reservation signal may be at least one of an RRQ or an RRS. The computer-readable storage medium 1106 may further include transmitting software 1156 configured for various functions, including, for example, to determine whether to transmit a communication via the resource. Here, it is contemplated that the transmitting software 1156 may be configured to transmit the communication via the resource, if the channel reservation signal is not detected, and configured to not transmit the communication via the resource, if the channel reservation signal is detected.

In a particular configuration, it is also contemplated that the wireless communication device 1100 includes means for monitoring at least one contention slot within a fixed frame period of an unlicensed spectrum; means for detecting whether a channel reservation signal associated with a higher priority node is within the at least one contention slot; and means for determining whether to transmit a communication. In one aspect, the aforementioned means may be the processor(s) 1104 configured to perform the functions recited by the aforementioned means. In another aspect, the aforementioned means may be a circuit or any apparatus configured to perform the functions recited by the aforementioned means.

Figure 12:
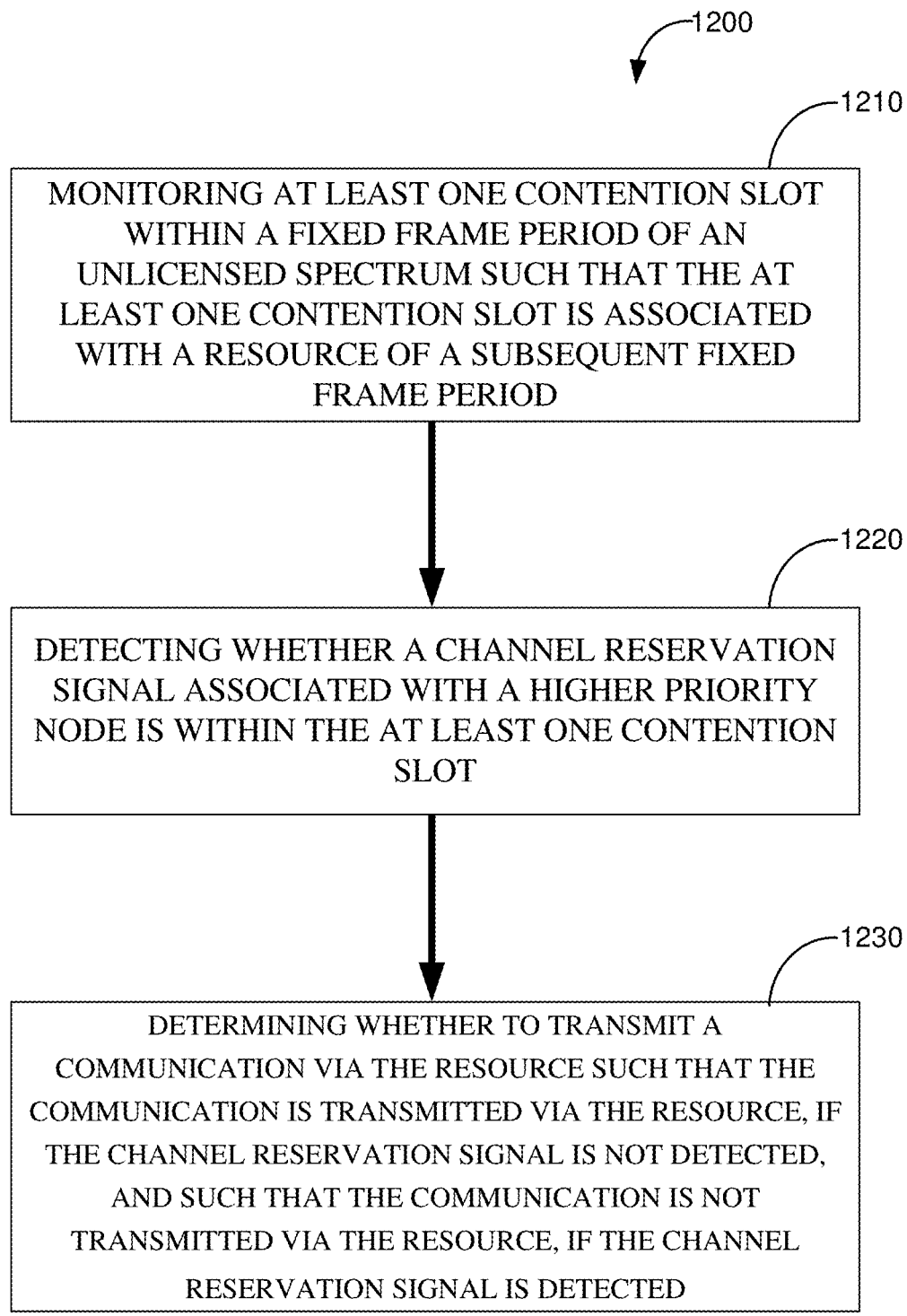
FIG. 12 is a flow chart illustrating an exemplary wireless communication device process that facilitates some aspects of the disclosure.
Figure 13:
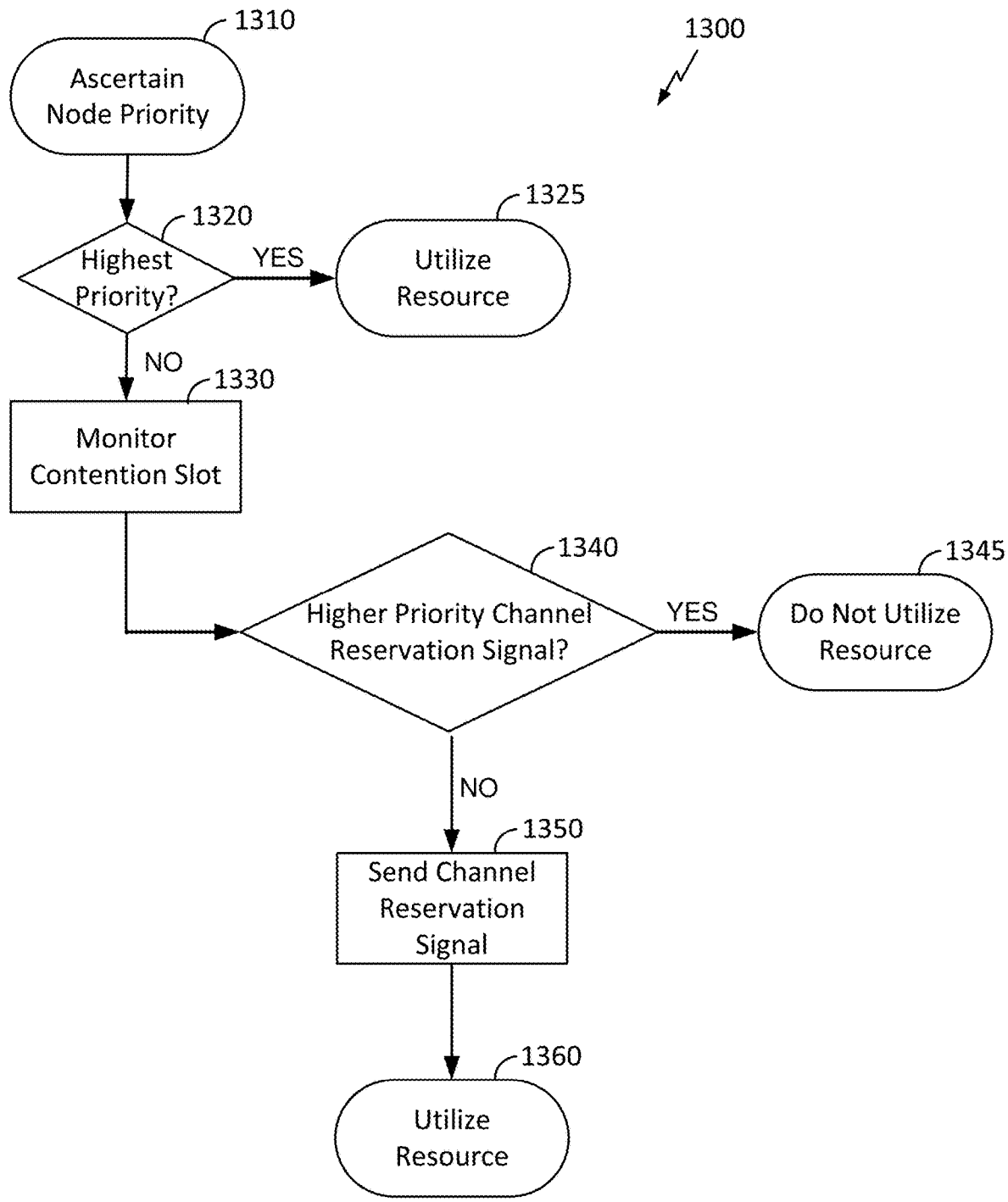
FIG. 13 is a flow chart illustrating an exemplary process that facilitates utilizing a multi-operator shared spectrum structure in accordance with aspects disclosed herein.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described herein and utilizing, for example, the processes and/or algorithms described in relation to FIG. 12 and/or FIG. 13.

In FIG. 12, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 1200 may be carried out by the wireless communication device 1100 illustrated in FIG. 11. In some examples, the process 1200 may be carried out by any suitable apparatus or means for carrying out the functions or algorithm described below.

Process 1200 begins at block 1210 with the wireless communication device 1100 monitoring at least one contention slot within a fixed frame period of an unlicensed spectrum such that the at least one contention slot is associated with a resource of a subsequent fixed frame period. Process 1200 then proceeds to block 1220 where the wireless communication device 1100 detects whether a channel reservation signal associated with a higher priority node is within the at least one contention slot. Process 1200 then concludes at block 1230 where the wireless communication device 1100 determines whether to transmit a communication via the resource such that the communication is transmitted, if the channel reservation signal is not detected, and such that the communication is not transmitted, if the channel reservation signal is detected.

Referring next to FIG. 13, a flow chart is provided illustrating an exemplary process that facilitates utilizing a multi-operator shared spectrum structure in accordance with aspects disclosed herein. As described below, some or all illustrated features may be omitted in a particular implementation within the scope of the present disclosure, and some illustrated features may not be required for implementation of all embodiments. In some examples, the process 1300 may be carried out by the wireless communication device 1100 illustrated in FIG. 11. In some examples, the process 1300 may be carried out by any suitable apparatus or means for carrying out the functions or algorithm described below.

Process 1300 begins at block 1310 with the wireless communication device 1100 ascertaining a node priority of the wireless communication device 1100. At block 1320, the wireless communication device 1100 then determines whether the wireless communication device 1100 is a highest priority node. If the wireless communication device 1100 is indeed a highest priority node, process 1300 concludes at block 1325 where the wireless communication device 1100 utilizes an unlicensed spectrum resource of a subsequent fixed frame period to transmit a communication. Otherwise, if the wireless communication device 1100 is not a highest priority node, process 1300 proceeds to block 1330 where the wireless communication device 1100 monitors the contention slot.

At block 1340, the wireless communication device 1100 then determines whether a higher priority channel reservation signal has been detected in the contention slot. If a higher priority channel reservation signal is indeed detected, process 1300 concludes at block 1345 where the wireless communication device 1100 does not utilize the unlicensed spectrum resource of the subsequent fixed frame period to transmit a communication. Otherwise, if a higher priority channel reservation signal is not detected, process 1300 proceeds to block 1350 where the wireless communication device 1100 contends for the unlicensed spectrum resource of the subsequent fixed frame period by transmitting a contending channel reservation signal in the current fixed frame period, and subsequently concludes at block 1360 where the wireless communication device 1100 utilizes the unlicensed spectrum resource of the subsequent fixed frame period to transmit a communication.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    monitoring at least one contention slot within a fixed frame period of an unlicensed spectrum, the at least one contention slot associated with a resource of a subsequent fixed frame period of the unlicensed spectrum, the fixed frame period comprising a channel occupancy time (CoT) allocated for transmitting data, an idle period in the fixed frame period after the CoT, and the at least one contention slot within the CoT, wherein the monitoring comprises monitoring the at least one contention slot within a portion of the fixed frame period occurring before the idle period;
    wherein the fixed frame period and the subsequent fixed frame period have a same duration;
    detecting whether a channel reservation signal associated with a higher priority node is within the at least one contention slot; and
    determining whether to transmit a communication via the resource,
    wherein the communication is transmitted via the resource, if the channel reservation signal is not detected,
    wherein the communication is not transmitted via the resource, if the channel reservation signal is detected, and
    wherein the fixed frame period is assigned to a first node and the subsequent frame period is assigned to a second node and wherein the detecting comprises detecting whether the channel reservation signal associated with the second node is within the at least one contention slot.

2. The method of claim 1, wherein the monitoring further comprises monitoring the at least one contention slot within a portion of the fixed frame period occurring immediately before the idle period.

3. The method of claim 1, wherein the detecting comprises detecting at least one of a reservation request (RRQ) or a reservation response (RRS), and wherein the channel reservation signal associated with the higher priority node is one of the RRQ or the RRS.

4. The method of claim 1, wherein the monitoring is performed by a node when the node is a lesser priority node of the subsequent fixed frame period and the node occupies the CoT of the fixed frame period.

5. The method of claim 1, wherein the determining further comprises contending for the resource of the subsequent fixed frame period by a node transmitting a contending channel reservation signal in the at least one contention slot of the fixed frame period, wherein the at least one contention slot is belonging to the node.

6. The method of claim 5, wherein the contending is performed by a node according to a priority of the node and wherein the priority of the node is rotated in contention slots at the subsequent fixed frame period.

7. The method of claim 6, wherein the contending is performed when the node is a higher priority node of the subsequent fixed frame period.

8. The method of claim 6, wherein the contending comprises transmitting the contending channel reservation signal before processing the channel reservation signal associated with the higher priority node, and wherein the contending results in multiple nodes respectively transmitting multiple channel reservation signals within the fixed frame period.

9. A wireless communication device comprising:
    a transceiver;
    a memory; and
    a processor coupled to the transceiver and the memory, wherein the processor and memory are configured to:
    monitor at least one contention slot within a fixed frame period of an unlicensed spectrum and prior to an idle period of the fixed frame period, wherein the fixed frame period comprises a channel occupancy time (CoT) allocated for transmitting data, the idle period in the fixed frame period after the CoT, and the at least one contention slot within the CoT, the at least one contention slot associated with a resource of a subsequent fixed frame period of the unlicensed spectrum;
wherein the fixed frame period and the subsequent fixed frame period have a same duration;
detect whether a channel reservation signal associated with a higher priority node is within the at least one contention slot;
initiate transmission of a communication via the resource using the transceiver, in response to a determination that the channel reservation signal is not detected, and
not initiate transmission of the communication via the resource, in response to a determination that the channel reservation signal is detected,
wherein the fixed frame period is assigned to a first node and the subsequent frame period is assigned to a second node and wherein the detecting comprises detecting whether the channel reservation signal associated with the second node is within the at least one contention slot.

10. The wireless communication device of claim 9, wherein the processor and memory are configured to monitor the at least one contention slot within a portion of the fixed frame period occurring immediately before the idle period.

11. The wireless communication device of claim 9, wherein the processor and memory are configured to detect at least one of a reservation request (RRQ) or a reservation response (RRS), and wherein the channel reservation signal associated with the higher priority node is one of the RRQ or the RRS.

12. The wireless communication device of claim 9, wherein the processor and memory are configured to monitor the at least one contention slot based on a priority associated with a node, and wherein the processor and memory are further configured to monitor the at least one contention slot when the node is a lesser priority node of the fixed frame period.

13. The wireless communication device of claim 9, wherein the processor and memory are configured to contend for the resource of the subsequent fixed frame period by a node transmitting a contending channel reservation signal in the at least one contention slot of the fixed frame period, wherein the at least one contention slot is belonging to the node.

14. The wireless communication device of claim 13, wherein the processor and memory are configured to contend for the resource of the subsequent fixed frame period according to a priority associated with a node and wherein the priority of the node is rotated in contention slots at the subsequent fixed frame period.

15. The wireless communication device of claim 14, wherein the processor and memory are configured to contend for the resource of the subsequent fixed frame period when the node is a higher priority node of the subsequent fixed frame period.

16. The wireless communication device of claim 14, wherein the processor and memory are configured to transmit the contending channel reservation signal before the processor processes the channel reservation signal associated with the higher priority node, and wherein contending for the resource of the subsequent fixed frame period results in multiple nodes respectively transmitting multiple channel reservation signals within the fixed frame period.

17. An apparatus for wireless communication, comprising:
means for monitoring at least one contention slot within a fixed frame period of an unlicensed spectrum and prior to an idle period of the fixed frame period, wherein the fixed frame period comprises a channel occupancy time (CoT) allocated for transmitting data, the idle period in the fixed frame period after the CoT, and the at least one contention slot within the CoT, the at least one contention slot associated with a resource of a subsequent fixed frame period of the unlicensed spectrum;
wherein the fixed frame period and the subsequent fixed frame period have a same duration;
means for detecting whether a channel reservation signal associated with a higher priority node is within the at least one contention slot; and
means for determining whether to transmit a communication via the resource,
wherein the communication is transmitted via the resource, if the channel reservation signal is not detected,
wherein the communication is not transmitted via the resource, if the channel reservation signal is detected, and
wherein the fixed frame period is assigned to a first node and the subsequent frame period is assigned to a second node and wherein the detecting comprises detecting whether the channel reservation signal associated with the second node is within the at least one contention slot.

18. The apparatus of claim 17, wherein the means for detecting is configured to detect at least one of a reservation request (RRQ) or a reservation response (RRS), and wherein the channel reservation signal associated with the higher priority node is one of the RRQ or the RRS.

19. The apparatus of claim 17, wherein the means for monitoring is configured to monitor the at least one contention slot based on a priority associated with a node, and wherein the means for monitoring is further configured to monitor the at least one contention slot when the node is a lesser priority node of the fixed frame period.

20. The apparatus of claim 17, wherein the means for determining is configured to contend for the resource of the subsequent fixed frame period by transmitting a contending channel reservation signal in the fixed frame period.

21. The apparatus of claim 20, wherein the means for determining is configured to contend for the resource of the subsequent fixed frame period according to a priority associated with a node.

22. A non-transitory computer-readable medium storing computer-executable code, comprising code for causing a wireless communication device to:
monitor at least one contention slot within a fixed frame period of an unlicensed spectrum, the at least one contention slot associated with a resource of a subsequent fixed frame period of the unlicensed spectrum, the fixed frame period comprising a channel occupancy time (CoT) allocating for transmitting data, an idle period in the fixed frame period after the CoT, and the at least one contention slot within the CoT, wherein the monitoring comprises monitoring the at least one contention slot within a portion of the fixed frame period occurring before the idle period;
wherein the fixed frame period and the subsequent fixed frame period have a same duration;

detect whether a channel reservation signal associated with a higher priority node is within the at least one contention slot; and determine whether to transmit a communication via the resource, wherein the communication is transmitted via the resource, if the channel reservation signal is not detected, wherein the communication is not transmitted via the resource, if the channel reservation signal is detected, and wherein the fixed frame period is assigned to a first node and the subsequent frame period is assigned to a second node and wherein the detecting comprises detecting whether the channel reservation signal associated with the second node is within the at least one contention slot.

23. The non-transitory computer-readable medium of claim 22, wherein the code comprises code for causing the wireless communication device to monitor the at least one contention slot based on a priority associated with a node, and wherein the code comprises code for causing the wireless communication device to monitor the at least one contention slot when the node is a lesser priority node of the fixed frame period.

24. The non-transitory computer-readable medium of claim 22, wherein the code comprises code for causing the wireless communication device to contend for the resource of the subsequent fixed frame period by transmitting a contending channel reservation signal in the fixed frame period.

25. The non-transitory computer-readable medium of claim 24, wherein the code comprises code for causing the wireless communication device to contend for the resource of the subsequent fixed frame period according to a priority associated with a node.

26. The non-transitory computer-readable medium of claim 25, wherein the code comprises code for causing the wireless communication device to contend for the resource of the subsequent fixed frame period only if the node is not a lowest priority node of the fixed frame period.

27. The non-transitory computer-readable medium of claim 25, wherein the code comprises code for causing the wireless communication device to transmit the contending channel reservation signal before processing the channel reservation signal associated with the higher priority node, and wherein contending for the resource of the subsequent fixed frame period results in multiple nodes respectively transmitting multiple channel reservation signals within the fixed frame period.

28. The method of claim 1, wherein the detecting comprises detecting a reservation request (RRQ) and a reservation response (RRS) within a single one of the at least one contention slots associated with the higher priority node.

29. The method of claim 1, wherein there is only one contention slot in each fixed frame period.

30. The wireless communication device of claim 9, wherein the processor and memory are configured to detect whether a channel reservation signal is within the at least one contention slot by detecting a reservation request (RRQ) and a reservation response (RRS) within a single one of the at least one contention slots associated with the higher priority node.

* * * * *